United States Patent [19]
Yuval et al.

[11] Patent Number: 5,586,186
[45] Date of Patent: Dec. 17, 1996

[54] METHOD AND SYSTEM FOR CONTROLLING UNAUTHORIZED ACCESS TO INFORMATION DISTRIBUTED TO USERS

[75] Inventors: Gideon A. Yuval, Mercer Island; Michael Ernst, Redmond, both of Wash.

[73] Assignee: Microsoft Corporation, Redmond, Wash.

[21] Appl. No.: 275,500

[22] Filed: Jul. 15, 1994

[51] Int. Cl.$^6$ .......................................... H04L 9/30
[52] U.S. Cl. ..................... 380/30; 380/4; 380/25
[58] Field of Search ........................... 380/4, 30, 25

[56] References Cited

U.S. PATENT DOCUMENTS

| | | | |
|---|---|---|---|
| 4,405,829 | 9/1983 | Rivest et al. | 380/30 |
| 4,658,093 | 4/1987 | Hellman | 380/4 |
| 4,670,857 | 6/1987 | Rackman | 380/4 |
| 4,944,007 | 7/1990 | Austin | 380/30 X |
| 5,222,133 | 6/1993 | Chou et al. | 380/4 |
| 5,319,705 | 6/1994 | Halter et al. | 380/4 |

OTHER PUBLICATIONS

Desmedt, Yvo G. (ed.), *Advances in Cryptology—Crypto '94, Proc. of the 14th Int'l Cryptology Conf., Santa Barbara, CA, Aug. 21–25, 1994*, Springer–Verlag, Heidelberg, 1994, pp. 257–270.
Koyama et al., "New Public–Key Schemes Based on Elliptic Curves over the Ring $Z_n$," *Advances in Cryptology—Crypto '91, Proc. of the 11th Int'l. Cryptology Conf.*, Springer–Verlag, Heidelberg, 1991, pp. 252–266.
Menezes, *Elliptic Curve Public Key Cryptosystems*, Kluwer Academic Publishers, Boston, MA, 1993, pp. 1–128.
Rivest et al., "A Method for Obtaining Digital Signatures and Public–Key Cryptosystems," *Communications of the ACM* 21(2):120–126, 1978.
Cormen et al., *Introduction to Algorithms*, MIT Press and McGraw–Hill, pp. 801–852, 1990.
Hamming, "Error Detecting and Error Correcting Codes," *The Bell System Technical Journal* 26(2):147–160, 1950.
Tanenbaum, *Computer Networks*, 2d ed., pp. 206–212.
Blahut, *Theory and Practice of Error Control Codes*, pp. 54–55.
Vanstone et al., *An Introduction to Error Correcting Codes with Applications*, Kluwer Academic Publishers, pp. 65–69.
*Encyclopedia of Mathematics and Its Applications*, pp. 142–143.
Schneier, *Applied Cryptography: Protocols, Algorithms, and Source Code in C*, John Wiley & Sons, Inc., pp. 281–288, 1994.
Lewis et al., *Elements of the Theory of Computation*, Prentice–Hall, Inc., Englewood Cliffs, NJ, pp. 242–248, 1981.
"The Arcade Project: A Progress Report," *Ciphertext, The RSA Newsletter* 2(1):6–7, 1994.
"Apple Computer: Launches Software Dispatch," Newswire Mailing, from Microsoft, Oct. 11, 1993, 136 lines.
Flynn, Mary Kathleen, "Software Samplers Coming on CD–ROM," *PC Magazine*, Sep. 28, 1993, 53 lines.

*Primary Examiner*—Gilberto Barrón, Jr.
*Attorney, Agent, or Firm*—Seed and Berry LLP

[57] ABSTRACT

A system for controlling unauthorized access to information distributed to users and, more particularly, for controlling unauthorized access to software distributed to users is provided. One method utilizing the system of the present invention enables the software to be encrypted using a single encryption key and to be decrypted using a multiplicity of "decryption" keys, each of which is unique to a particular user. The "decryption" keys are the products of numeric representations of identifying information relating to users and unique user keys generated using the numeric representations and a "true" decryption key. Since each user receives a unique user key and both the numeric representation and the user key are generated using the identifying information, if the user reveals the numeric representation and the user key (or the product of the numeric representation and the user key), the numeric representation and the user key can be traced to the user who revealed them. Another method utilizing the system of the present invention introduces randomness or pseudo-randomness into the decryption scheme to provide an additional level of security to the scheme.

39 Claims, 10 Drawing Sheets

METHOD AND SYSTEM FOR CONTROLLING UNAUTHORIZED ACCESS TO INFORMATION DISTRIBUTED TO USERS

FIELD OF THE INVENTION

This invention relates generally to a method and system for controlling unauthorized access to information distributed to users and, more particularly, to a method and system for controlling unauthorized access to software distributed to users.

BACKGROUND OF THE INVENTION

Traditionally, software has been distributed on floppy disks. Each disk typically contained one application program and was individually sold to a user. The purchase of the disk carried with it an implicit license to use the program. With the advent of high capacity storage media, such as CD-ROM, the distribution of software has evolved. Software vendors have begun to distribute their software on CD-ROM. A single CD-ROM can contain hundreds of a vendor's application programs. Since each user may not want to purchase every program that is stored on the CD-ROM, and since vendors do not want users to be able to access programs that they have not purchased, some vendors have stored their programs in encrypted form on the CD-ROM. The vendors then need to enable users to obtain the decrypted form of the program(s) that they have purchased.

One solution is to encrypt each application program on every CD-ROM using a single encryption key and to provide users with the corresponding decryption key once they have purchased a particular program. Following this system, when a user desires to purchase an application program stored on a CD-ROM, the user simply calls the vendor, gives the vendor the user's credit card number, and receives a decryption key from the vendor. The decryption key is input to an installation program that is also stored on the CD-ROM. The installation program decrypts the application program that the user has purchased and installs the program on the user's computer.

While this system makes the sale of the vendor's software more convenient for users, it also makes unauthorized access to the software easier. The user who has purchased the application program can reveal the decryption key to others who have not purchased the program and thus compromise the security provided by the encryption. Furthermore, since there is a single decryption key for each application program, the vendor cannot trace the key to the user who revealed it. Thus, any time software is widely distributed in encrypted form and a single encryption key and decryption key are used for all copies of the software, piracy is difficult to control.

Another solution is to encrypt each application program on each CD-ROM using a unique encryption key and to provide users with the corresponding decryption key once they have purchased a particular application program. While this system appears to provide total security (because it is irrelevant whether a user distributes his key to other users since each CD-ROM has unique keys), it is commercially infeasible. CD-ROM's are designed to be mass produced. If each CD-ROM has unique encryption and decryption keys, the CD-ROM's cannot be mass produced. Rather, each CD-ROM must be individually produced because the encrypted form on each CD-ROM is different. Thus, the cost of producing CD-ROM's with unique encryption and decryption keys is prohibitive.

Any solution involving encryption must be based on an encryption algorithm. Generally, there are two types of encryption algorithms, symmetric and public key. A symmetric algorithm is one in which the encryption key and the decryption key can be generated from each other. Often, the encryption key and the decryption key will be the same. A public key algorithm, on the other hand, is one in which the encryption key and the decryption key are different. Generally, the encryption key is made public, the decryption key is kept secret, and the private decryption key cannot be easily generated from the public encryption key.

A well-known public key algorithm is the RSA algorithm. One embodiment of the RSA algorithm can be summarized as follows:

1. Select two prime numbers, p and q;
2. Compute the product of these numbers, n=pq;
3. Select encryption key e such that e is relatively prime to $((p-1)(q-1))$;
4. Compute decryption key d where $d=e^{-1}$ (mod p-1)(q-1);
5. Encrypt message m using $c=m^e$ mod n; and
6. Decrypt encrypted message c using $m=c^d$ mod n.

A cryptographic communications system and method based on the RSA algorithm are found in U.S. Pat. No. 4,405,829 to Rivest et al. This patent is licensed by Public Key Partners of Sunnyvale, Calif.

Solutions involving encryption can only provide a certain level of security. Given sufficient resources, most encryption schemes can be broken. The goal is to make the expense of breaking the encryption scheme, or the risk associated with breaking the encryption scheme, greater than the value of the information that is encrypted. In such a situation, users generally will not expend the resources required to break the scheme. Thus, a solution is needed to enable software vendors to widely distribute their software in encrypted form on CD-ROM and to control access to the decrypted form of the software by users who have not purchased the software. This solution should be economically feasible for software vendors and must provide a reasonable level of security.

SUMMARY OF THE INVENTION

One aspect of the present invention provides a method and system for controlling unauthorized access to information distributed to users and, more particularly, for controlling unauthorized access to software distributed to users. The main components of the system of the present invention include an encryptor, a user key generator, and a decryptor. The encryptor is responsible for generating an encryption key (s) and a decryption key (s), encrypting the software using the encryption key(s), and storing the encrypted form(s) of the software on CD-ROM. The user key generator is responsible for generating a unique user key(s) using a numeric representation(s) of identifying information relating to a user and the decryption key (s). The decryptor is responsible for decrypting the encrypted form(s) of the software using the numeric representation (s) of the identifying information and the unique user key(s) and installing the software on the user's computer system.

One method utilizing the system of the present invention enables the software to be encrypted using a single encryption key and to be decrypted using a multiplicity of "decryption" keys, each of which is unique to a particular user. The "decryption" keys are the products of the numeric representations of identifying information relating to users and the unique user keys generated using the numeric representations and the "true" decryption key. Since each user receives a unique user key and both the numeric representation and the user key are generated using the identifying information, if the user reveals the numeric representation and the user key (or the product of the numeric representation and the user key), the numeric representation and the user key can be traced to the user who revealed them. Another method utilizing the system of the present invention introduces randomness or pseudo-randomness into the decryption scheme to provide an additional level of security to the scheme.

DETAILED DESCRIPTION OF THE PREFERRED EMBODIMENTS

The preferred embodiments of the present invention provide a system for controlling unauthorized access to software distributed to users. One method utilizing the system of the present invention enables the software to be encrypted using a single encryption key and to be decrypted using a multiplicity of "decryption" keys, each of which is unique to a particular user. The "decryption" keys are the products of numeric representations of identifying information relating to users and unique user keys generated using the numeric representations and a "true" decryption key. Since each user receives a unique user key and both the numeric representation and the user key are generated using the identifying information, if the user reveals the numeric representation and the user key (or the product of the numeric representation and the user key), the numeric representation and the user key can be traced to the user who revealed them. Another method utilizing the system of the present invention introduces randomness or pseudo-randomness into the decryption scheme to provide an additional level of security to the scheme.

The preferred embodiments of the present invention use a public key algorithm. As discussed above, a public key algorithm is one in which the encryption key and the decryption key are different. Generally, the encryption key is made public, the decryption key is kept secret, and the private decryption key cannot be easily generated from the public encryption key. More specifically, the preferred embodiments of the present invention use a modified RSA algorithm. The modified RSA algorithm used in the present invention is partially based on the RSA algorithm, but provides additional features not provided by the RSA algorithm (these additional features will be described in detail below).

Figure 1:
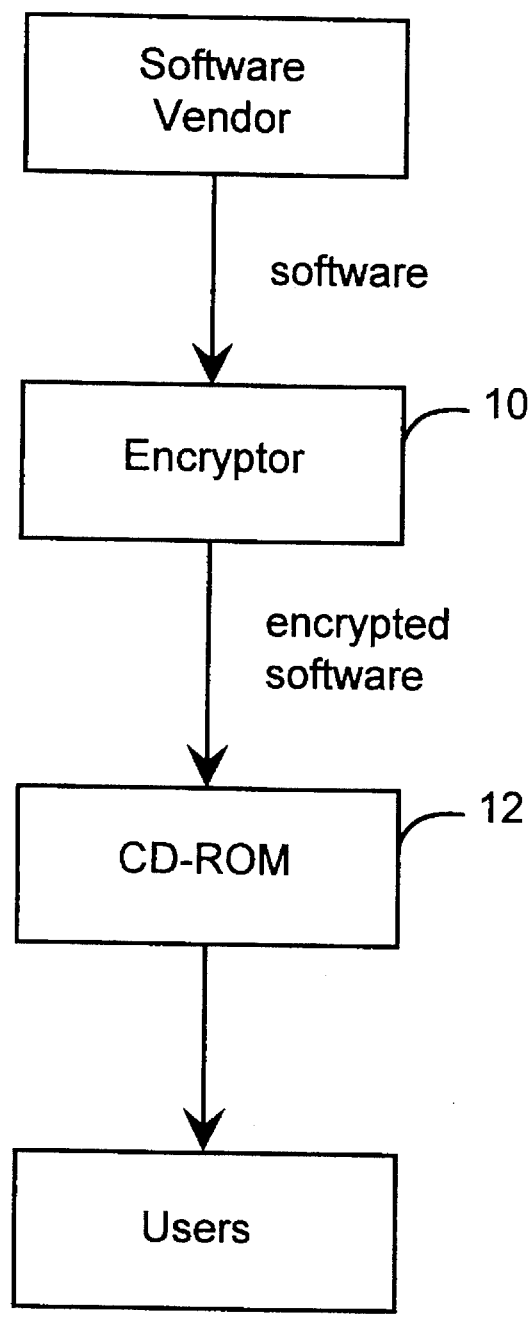
FIG. 1 is a block diagram that illustrates encryption components of a system of the present invention.
Figure 2:
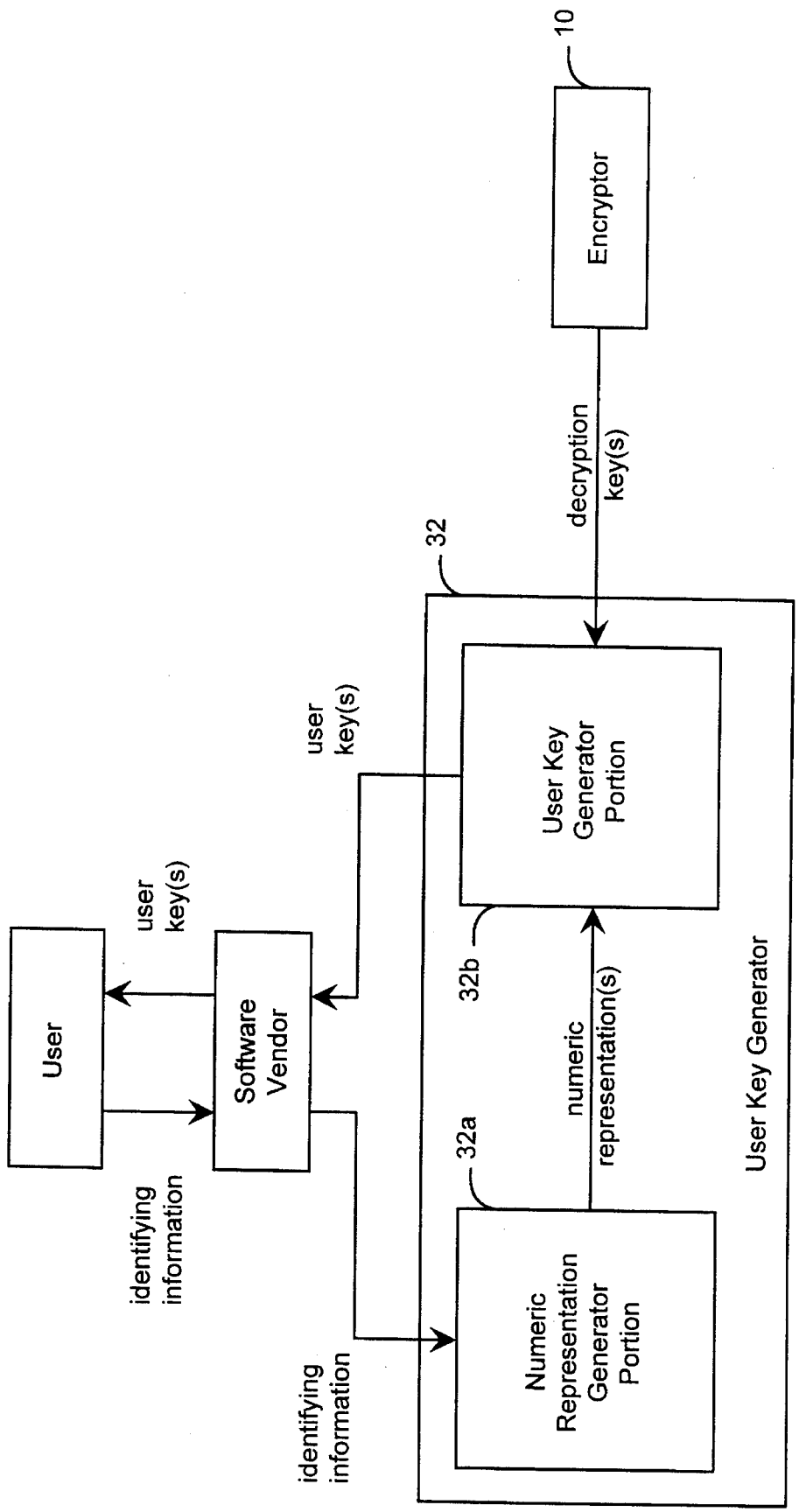
FIG. 2 is a block diagram that illustrates user key generation components of the system of the present invention.
Figure 3:
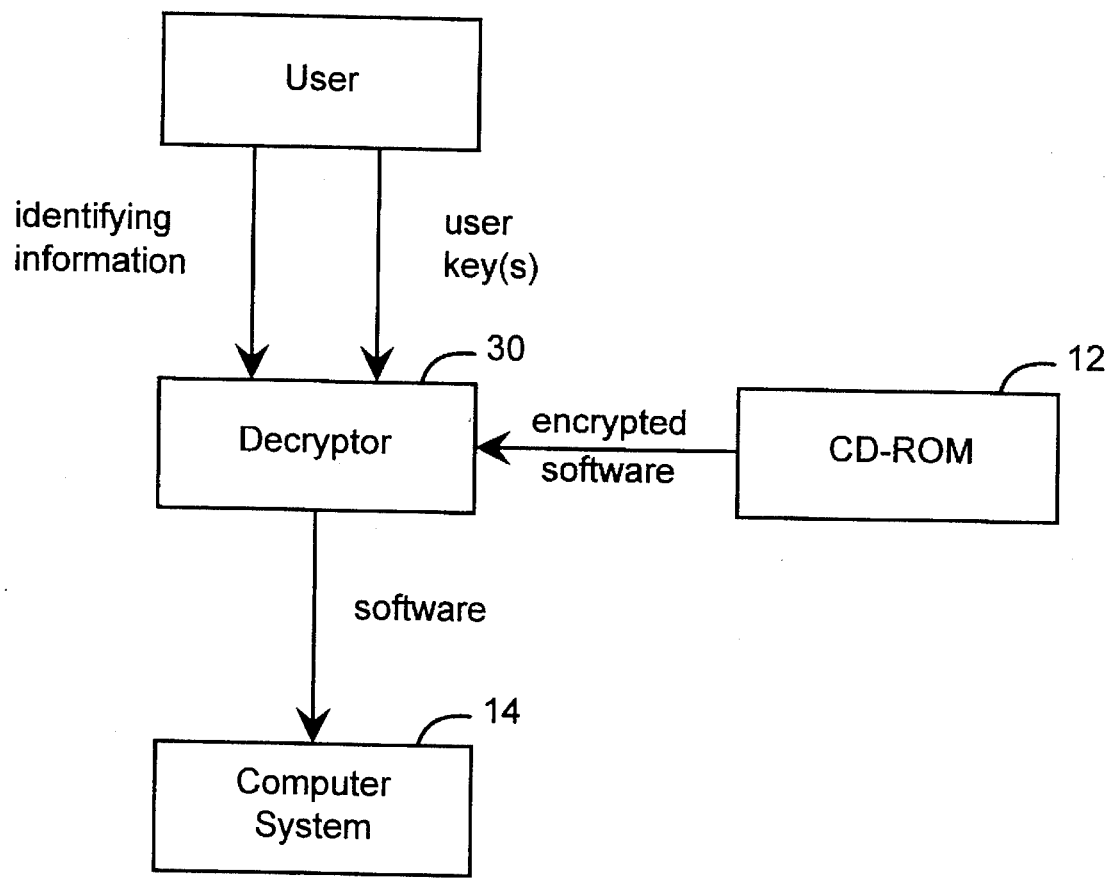
FIG. 3 is a block diagram that illustrates decryption components of the system of the present invention.
Figure 4:
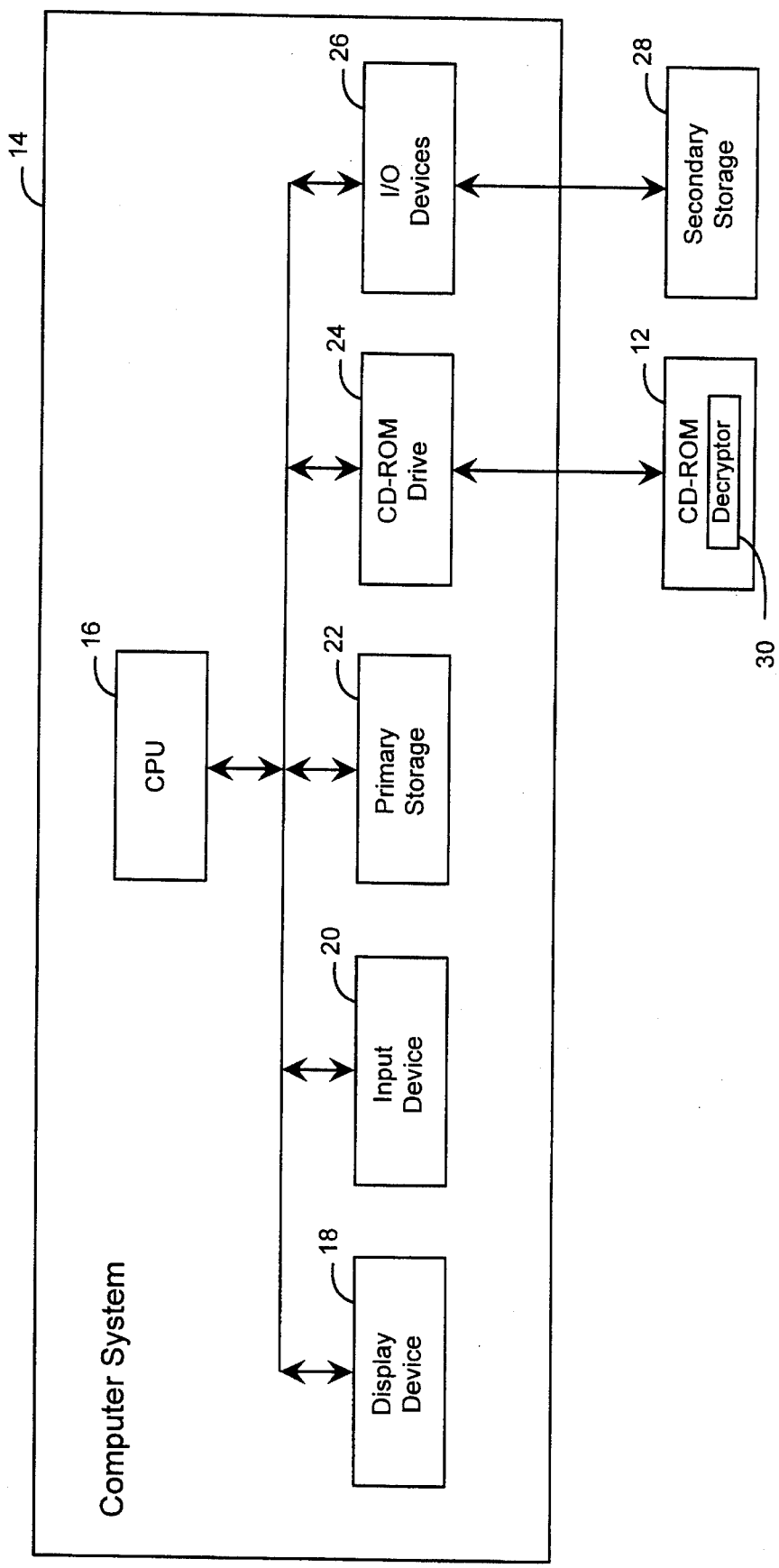
FIG. 4 is a block diagram that illustrates the components of a user's computer system in which a CD-ROM distributed by a software vendor is used.

FIGS. 1 through 3 illustrate the components of the system of the present invention and how these components perform the cryptographic protocol of the present invention. The main components include an encryptor, a user key generator, and a decryptor. FIG. 1 illustrates the encryptor and related components. The encryptor is responsible for generating an encryption key(s) and a decryption key(s), encrypting the software using the encryption key(s), and storing the encrypted form(s) of the software on CD-ROM. FIG. 2 illustrates the user key generator and related components. The user key generator is responsible for generating a unique user key(s) using a numeric representation(s) of identifying information relating to a user and the decryption key(s). FIG. 3 illustrates the decryptor and related components. The decryptor is responsible for decrypting the encrypted form(s) of the software using the numeric representation(s) of the identifying information and the unique user key(s) and installing the software on the user's computer system. FIG. 4 illustrates the components of such a user's computer system.

Referring in detail to FIG. 1, a software vendor provides an encryptor 10 with the software to be distributed. The encryptor 10 generates an encryption key(s) and a decryption key(s) using the RSA algorithm. The encryptor 10 then encrypts the software using the encryption key(s) and stores the encrypted form(s) of the software on CD-ROM 12. The software vendor distributes the CD-ROM 12 with the encrypted form(s) of the software thereon to users. While the preferred embodiments of the present invention involve the encryption and decryption of software stored on CD-ROM, one of ordinary skill in the art will appreciate that the principles of the present invention may be applied to any type of information stored on any form of storage media (e.g., floppy disks, hard disks, tape). Furthermore, one of ordinary skill in the art will appreciate that the principles of the present invention may be applied to information distributed through any broadcast medium (e.g., electronic bulletin boards, pay-per-view cable television).

After receiving a CD-ROM 12 from the software vendor, the user can use the CD-ROM 12 in a computer system 14, such as the one illustrated in FIG. 4. The user's computer system 14 includes a central processing unit ("CPU") 16, a display device 18, an input device 20 (such as a keyboard or a mouse), a primary storage 22, a CD-ROM drive 24, and other input/output ("I/O") devices 26 (such as disk drives or tape drives). The CD-ROM drive 24 enables the CPU 16 to access data stored on CD-ROM 12, and the other I/O devices 26 enable the CPU 16 to access data stored on other forms of secondary storage 28 (such as disks or tapes). The user inserts the CD-ROM 12 into the CD-ROM drive 24. The CD-ROM 12 may have unencrypted demonstrations that allow the user to see how particular software products operate. When the user desires to access a particular encrypted software product, the user runs a decryptor 30 that is stored on the CD-ROM 12. The decryptor 30 instructs the user to contact the software vendor.

Referring in detail to FIG. 2, after receiving instructions from the decryptor 30, the user contacts the software vendor and provides the vendor with some identifying information relating to the user. In the preferred embodiments of the present invention, the identifying information is a name, a credit card number, and an expiration date. However, one of ordinary skill in the art will appreciate that the identifying information could also include a bank account number, a social security number, or any combination of information relating to the user. To provide a higher level of security, the identifying information should include information that the user would not want to divulge to others (e.g., a credit card number, a bank account number). The software vendor provides a numeric representation generator portion 32a of a user key generator 32 with the identifying information. The numeric representation generator portion 32a generates a numeric representation(s) of the identifying information and provides a user key generator portion 32b of the user key generator 32 with the numeric representation(s). Further, the encryptor 10 provides the user key generator portion 32b with the decryption key(s). The user key generator portion 32b then generates a unique user key(s) using the numeric representation(s) and the decryption key(s) and provides the software vendor with the unique user key(s). The software vendor in turn provides the user with the unique user key(s). While the user key generation portion 32b uses the decryption key(s) to generate the unique user key(s), one of ordinary skill in the art will appreciate that the user key generation portion 32b could also use information from which the decryption key(s) can be derived, instead of directly using the decryption key(s).

Referring in detail to FIG. 3, after receiving the unique user key(s) from the software vendor, the user inputs the identifying information and the unique user key(s) to the decryptor 30. The decryptor 30 generates the numeric representation(s) of the identifying information. The decryptor 30 then decrypts the encrypted form(s) of the software using the numeric representation(s) and the unique user key(s) and installs the software on the user's computer system 14.

Figure 5A:
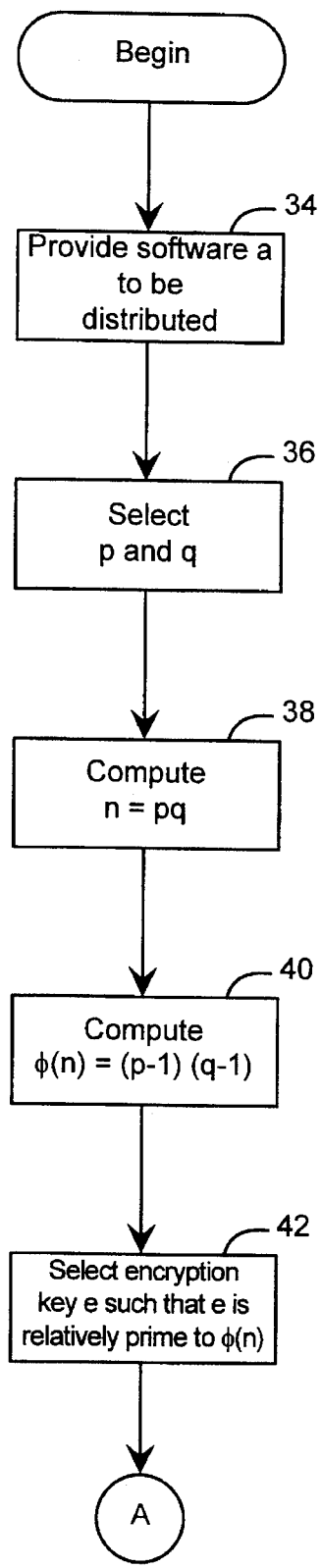
FIGS. 5A–5C collectively are a high level flow chart illustrating the steps performed in the encryption and decryption of software in accordance with one method utilizing the system of FIGS. 1–3.
Figure 5B:
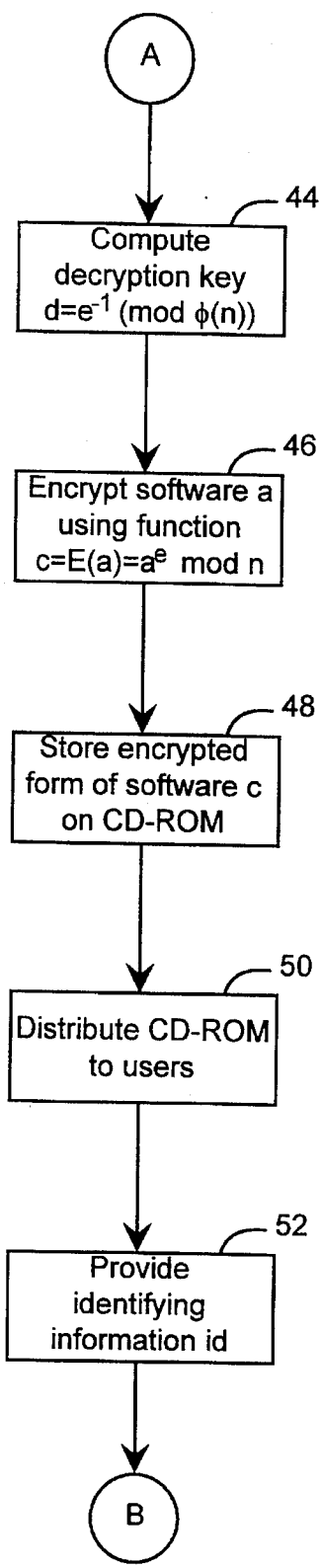
Figure 5C:
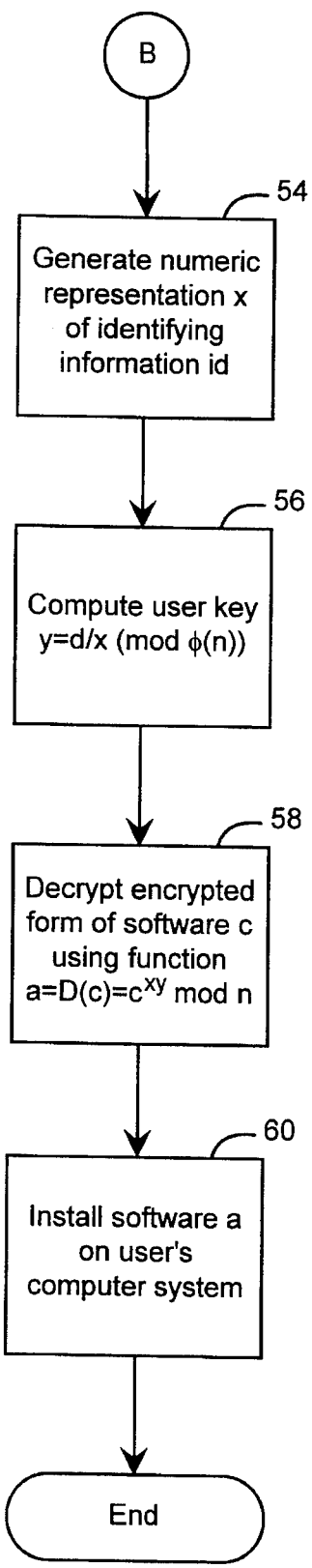

The steps performed in the encryption and decryption of software in accordance with one method utilizing the system of FIGS. 1–3 are illustrated in detail in FIGS. 5A–5C. Initially, the software vendor provides the encryptor 10 with the software a to be distributed (step 34). The encryptor 10 selects two large prime numbers, p and q (step 36). The encryptor 10 then computes the product of these numbers (step 38):

$$n=pq \qquad \text{(Eq. 1)}$$

The size of p and q is chosen so that n cannot be easily factored. In fact, the security of the RSA algorithm is derived from the difficulty of factoring the product of two large prime numbers. Given current factoring technology, if p and q are approximately 70–80 digits each, n cannot be easily factored. As factoring technology advances, the size of p and q will need to be increased accordingly. As the size of p and q increases, the system becomes more secure. However, as the size of p and q increases, the system also becomes less efficient and less convenient for the user. Thus, there must be a balance between the amount of security needed and the practical time constraints imposed on the system. Next, the encryptor 10 computes φ(n) (step 40). Since p and q are prime numbers, the Euler totient function or Euler phi function, φ(n), is:

$$\phi(n)=(p-1)(q-1) \qquad \text{(Eq. 2)}$$

Given φ(n), the encryptor 10 randomly selects the encryption key e such that e is relatively prime to φ(n) (step 42). Two numbers are relatively prime if they share no factors in common other than 1. The encryptor 10 then computes the decryption key d (step 44) such that:

$$ed \bmod \phi(n)=1 \qquad \text{(Eq. 3a)}$$

Thus, $$d=e^{-1}(\bmod \phi(n)) \qquad \text{(Eq. 3b)}$$

The encryptor 10 encrypts the software a using the encryption function (step 46):

$$c=E(a)=a^e \bmod n \qquad \text{(Eq. 4)}$$

and stores the encrypted form of the software c on CD-ROM 12 (step 48). The software vendor distributes the CD-ROM 12 with the encrypted form of the software c thereon to users (step 50).

In practice, when the software is encrypted (and later decrypted), the software is broken down into smaller blocks, each of the blocks is encrypted/decrypted, and the results of each of the encryptions/decryptions are concatenated together. Additionally, if efficiency is a consideration (which, to some extent, it generally will be), only selected portions of the software (e.g., every tenth track on a CD-ROM) can be stored in encrypted form. The remainder of the software can be stored in its original unencrypted form. Since only a relatively small portion of the software is being encrypted/decrypted, the system will be more efficient.

Alternatively, another technique that can be employed to improve efficiency is to encrypt/decrypt the software using one or more private keys and to only encrypt/decrypt the private key(s) using the system of the present invention. In general, private key algorithms are faster than public key algorithms (and the system of the present invention uses a public key algorithm). Since the bulk of the encryption/decryption (i.e., encrypting/decrypting the software) is being performed using the private key algorithm, and only a fraction of the encryption/decryption (i.e., encrypting/decrypting the private key(s)) is being performed using the system of the present invention, the system will be more efficient. While several techniques for improving the efficiency of the system have been discussed, one of ordinary skill in the art will appreciate that other known techniques for improving the efficiency of a system using a public key algorithm may be employed.

The potential advantage of such time-saving techniques is that they reduce the amount of information needed in order to reconstruct, without knowledge of the top-level decryption key, the original (unencrypted) information. A user in possession of information can communicate it to anyone else, but this may be inconvenient or costly when much information is involved. The amount of communication needed to reconstruct the original information must be balanced against the speed of encryption and decryption.

A user who has received a CD-ROM 12 from the software vendor inserts the CD-ROM 12 into the CD-ROM drive 24 in the user's computer system 14. When the user desires to access a particular encrypted software product, the user runs the decryptor 30. The decryptor 30 instructs the user to contact the software vendor. Up until this point, the system of the present invention has implemented the RSA algorithm without modification. If the system exactly implemented the RSA algorithm, the modulus n and the encryption key e would be made public, and the decryption key d would be kept secret. Then, when the user contacted the software vendor, the vendor would provide the user with the decryption key d. The user would input the decryption key d to the decryptor, and the decryptor would decrypt the encrypted form of the software c using the decryption function:

$$a=D(c)=c^d \bmod n \qquad \text{(Eq. 5)}$$

However, the software vendor does not want to reveal the master decryption key d to users because then any user could reveal the key and the software vendor would not be able to trace the key to the user who had revealed it. Therefore, the system of the present invention diverges from the RSA algorithm at this point. First, only the modulus n is made public, and both d and e are kept secret. Additionally, instead of revealing the decryption key d to users, the software vendor generates the unique user key y for each user and only reveals the user key y to the user.

Referring back to FIGS. 5A–5C, in the system of the present invention, when the user contacts the software vendor, the user provides the vendor with the identifying information id (step 52). The software vendor provides the numeric representation generator portion 32a of the user key generator 32 with the identifying information id. The numeric representation generator portion 32a converts the identifying information id into the numeric representation x from which the identifying information id is uniquely determinable (step 54) and provides the user key generator portion 32b of the user key generator 32 with the numeric representation x. Further, the encryptor 10 provides the user key generator portion 32b with the decryption key d.

The user key generator portion 32b then computes the user key y using the function (step 56):

$$y = d/x \pmod{\phi(n)} \qquad \text{(Eq. 6)}$$

and provides the software vendor with the user key y. The software vendor in turn provides the user with the user key y. The user inputs the identifying information id and the user key y to the decryptor 30. The decryptor 30 computes the numeric representation x of the identifying information id. The decryptor 30 then decrypts the encrypted form of the software c using the decryption function (step 58):

$$a = D(c) = C^{xy} \bmod n \qquad \text{(Eq. 7)}$$

and installs the software a on the user's computer system 14 (step 60).

When the numeric representation x is multiplied by the user key y, the resulting product $d_{user}$ operates in the same manner as the decryption key d to decrypt the encrypted form of the software. Thus, the software can be recovered from its encrypted form using: (1) the decryption key d, (2) the numeric representation x and the user key y, or (3) the product xy of the numeric representation x and the user key y. The proof that the numeric representation x and the user key y (or the product xy) are equivalent to d (in terms of their ability to decrypt the encrypted form of the software) is as follows: since ed mod $\phi(n)=1$ and $y=d/x \pmod{\phi(n)}$ (see above), then:

$$exy = 1 \pmod{\phi(n)} \qquad \text{(Eq. 8)}$$

and $$
\begin{aligned}
D(E(a)) &= (a^e)^d \pmod{n} & \text{(Eq. 9a)} \\
&= (a^e)^{xy} \pmod{n} & \text{(Eq. 9b)} \\
&= a^{exy} \pmod{n} & \text{(Eq. 9c)} \\
&= a \pmod{n} & \text{(Eq. 9d)}
\end{aligned}
$$

If a user reveals x and y in order to enable others who have not purchased the software to decrypt the software, the software vendor can determine who the user is because the identifying information id is uniquely determinable from x. In one embodiment of the present invention, x is equal to the identifying information id. However, if x is equal to id and a user reveals the product of x and y (instead of x and y individually), the software vendor may not able to determine who the user is. In order to enable the software vendor to determine who the user is when only the product xy is revealed, id needs to be uniquely determinable from x, and x needs to be uniquely determinable from xy. In the preferred embodiments of the present invention, x is made uniquely determinable from the product xy by encoding the identifying information id in x using a Gödel numbering and an error-correcting coding. The Gödel numbering and the error-correcting coding can be performed in any order. However, one of ordinary skill in the art will appreciate that performing the error-correcting coding after the Gödel numbering and reversing the error-correcting coding before the Gödel numbering will decrease the chance of uncorrected errors.

Gödel numbering is a method of encoding strings as numbers. One Gödel numbering used in the preferred embodiments of the present invention associates with string id a number in $Z_{\phi(n)}$ with no large factors, where string id is a string comprising the alphanumeric characters of identifying information id and $Z_{\phi(n)}$ is the set of numbers from 0 to $\phi(n)-1$. More specifically, one Gödel numbering used raises the first k prime numbers in $Z\phi(n)$ that are relatively prime to $\phi(n)$ to the powers of the digits in string id, where k is the number of digits in string id. Thus, if string $id = i_0 i_1 i_2 \ldots i_k$ and the appropriate subset of $Z_{\phi(n)} = \{z_0, z_1, z_2, \ldots z_m\}$, where m is the number of prime numbers in $Z_{\phi(n)}$ that are relatively prime to $\phi(n)$, then:

$$
\begin{aligned}
x &= G(id) & \text{(Eq. 10a)} \\
&= G(i_0 i_1 i_2 \ldots i_k) & \text{(Eq. 10b)} \\
&= z_0^{i_0} * z_1^{i_1} * \ldots * z_{k-1}^{i_{k-1}} * z_k^{i_k} & \text{(Eq. 10c)}
\end{aligned}
$$

Another Gödel numbering used raises the first k prime numbers in $Z_{\phi(n)}$ that are relatively prime to $\phi(n)$ to the powers of the digits in string id in reverse order. These encodings are reversible and the identifying information id is uniquely determinable from x because the resulting Gödel number contains all small factors and is easy to factor.

Additionally, if y has no small factors, then x is uniquely determinable from xy because x is equal to the product of the small factors of xy. However, if y has some small factors (which it generally will), x is not uniquely determinable from xy. In order to make x uniquely determinable from xy, even when y has some small factors, an error-correcting coding is used. One of ordinary skill in the art will appreciate that any error-correcting coding that accomplishes the stated objective of making x uniquely determinable from xy may be used. For example, one well-known error-correcting coding that may be used is Hamming's classic (1950) code.

After the encryptor has encoded x using the given Gödel numbering and an error-correcting coding, the encryptor can compute y. Lastly, the encryptor can determine whether x is uniquely determinable from xy. In the (unlikely) event that x is not uniquely determinable from xy (that is, if the error-correcting coding fails), the encryptor can slightly modify the identifying information id (e.g., by adding a digit to the end of id) and then recompute x and y. The encryptor can repeat this last step until x and y are such that x is uniquely determinable from xy. If the encryptor modifies the identifying information id in order to make the error-correcting coding work (and thus, to make x uniquely determinable from xy), the modification will be reversed (e.g., the added digit will be removed from the end of id) when the error-correcting coding is reversed. The modification will be performed in such a way that given some identifying information, it is clear which modification has been performed and how to reverse it.

Figure 6A:
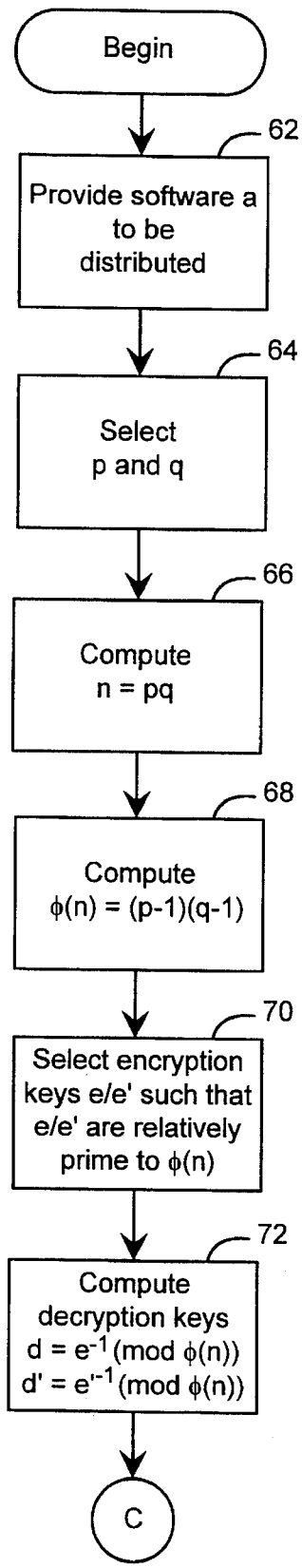
FIGS. 6A–6C collectively are a high level flow chart illustrating the steps performed in the encryption and decryption of software in accordance with another method utilizing the system of FIGS. 1–3.
Figure 6B:
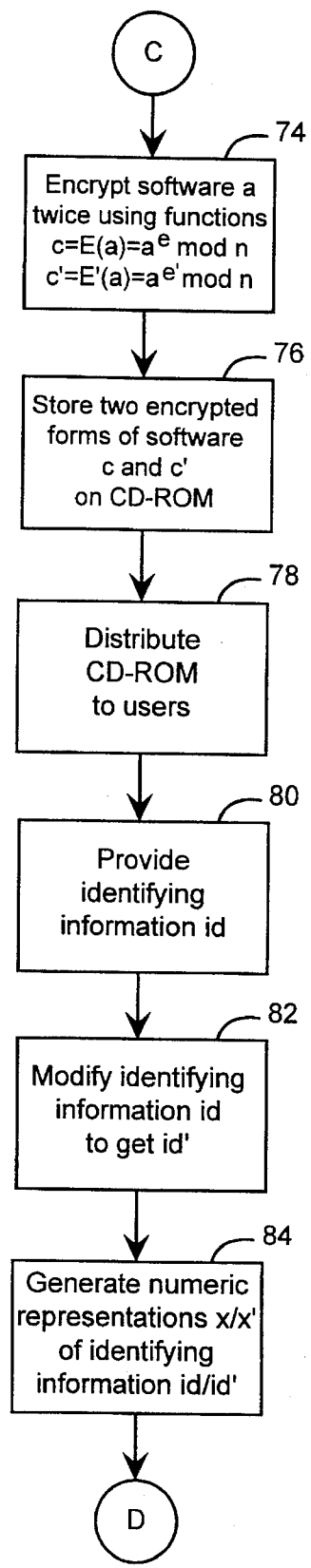
Figure 6C:
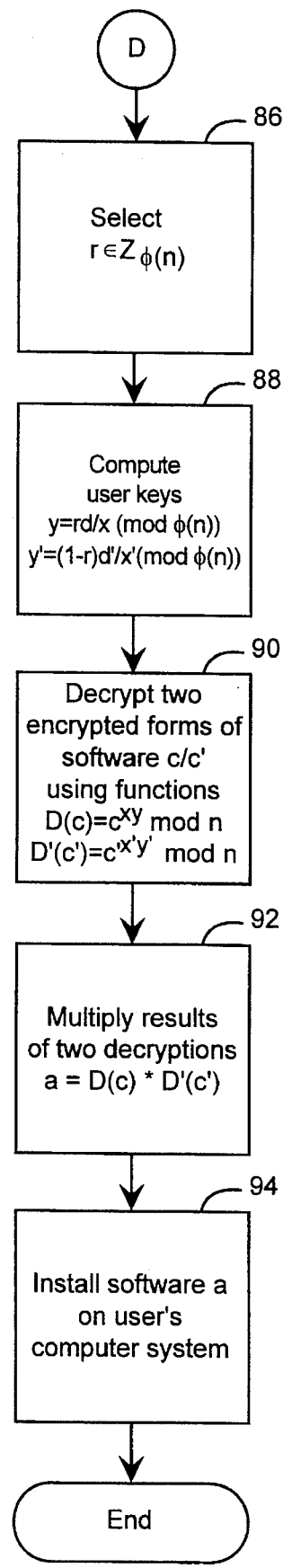

The steps performed in the encryption and decryption of software in accordance with another method utilizing the system of FIGS. 1–3 are illustrated in detail in FIGS. 6A–6C. This method introduces randomness or pseudo-randomness into the decryption scheme to make it more difficult for users to compute the decryption key d given two or more combinations of x and y. Generally, this is accomplished by encrypting the software twice using two different encryption keys and introducing a random number into the functions used to generate the user keys. As a result, the user keys cannot be used with the identifying information to directly decrypt the software (as in the first method). Rather, the user keys must be used with the identifying information to generate two "decrypted" forms of the software which when combined will recover the software.

As before, the software vendor provides the encryptor 10 with the software a to be distributed (step 62). The encryptor 10 selects two large prime numbers, p and q (step 64), computes the product of these numbers, $n = pq$ (step 66), and computes $\phi(n) = (p-1)(q-1)$ (step 68).

The encryptor 10 then randomly selects two encryption keys e and e' such that e and e' are relatively prime to $\phi(n)$ (step 70). Next, the encryptor 10 computes two decryption keys d and d' (step 72) such that:

$$ed \bmod \phi(n) = 1 \qquad \text{(Eq. 11a)}$$

and $$e'd' \bmod \phi(n) = 1 \qquad \text{(Eq. 11b)}$$

Thus, $$d = e^{-1} \pmod{\phi(n)} \qquad \text{(Eq. 12a)}$$

and $$d' = e'^{-1} \pmod{\phi(n)} \qquad \text{(Eq. 12b)}$$

The encryptor 10 encrypts the software a twice using the encryption functions (step 74):

$$c = E(a) = a^e \bmod n \qquad \text{(Eq. 13a)}$$

and $$c' = E'(a) = a^{e'} \bmod n \qquad \text{(Eq. 13b)}$$

and stores the two encrypted forms of the software c and c' on CD-ROM 12 (step 76). The software vendor distributes the CD-ROM 12 with the two encrypted forms of the software c and c' thereon to users (step 78).

A user who has received a CD-ROM 12 from the software vendor inserts the CD-ROM 12 into the CD-ROM drive 24 in the user's computer system 14. When the user desires to access a particular encrypted software product, the user runs the decryptor 30. The decryptor 30 instructs the user to contact the software vendor. When the user contacts the software vendor, the user provides the vendor with the identifying information id (step 80). The software vendor provides the numeric representation generator portion 32a of the user key generator 32 with the identifying information id.

The numeric representation generator portion 32a modifies the identifying information id to get modified identifying information id' (step 82). For example, the numeric representation generator portion 32a can add a zero to the beginning or end of id to get id'. The numeric representation generator portion 32a then converts the identifying information id and the modified identifying information id' into two numeric representations x and x', respectively, (step 84) and provides the user key generator portion 32b of the user key generator 32 with the numeric representations x and x'. In the preferred embodiments of the present invention, the two numeric representations x and x' are generated by encoding the identifying information id and the modified identifying information id' using the Gödel numbering and the error-correcting coding. Further, the encryptor 10 provides the user key generator portion 32b with the decryption key d.

Next, the user key generator portion 32b randomly selects r, where $r \in Z_{\phi(n)}$ (step 86). The user key generator portion 32b then computes two user keys y and y' using the functions (step 88):

$$y = rd/x \pmod{\phi(n)} \qquad \text{(Eq. 14a)}$$

and $$y' = (1-r)d'/x' \pmod{\phi(n)} \qquad \text{(Eq. 14b)}$$

and provides the software vendor with the two user keys y and y'. The software vendor in turn provides the user with the two user keys y and y'.

The user inputs the identifying information id and the two user keys y and y' to the decryptor 30. The decryptor 30 modifies the identifying information id to get the modified identifying information id' and computes the numeric representations x and x' of id and id'. The decryptor 30 then decrypts the two encrypted forms of the software c and c' using the decryption functions (step 90):

$$D(c) = c^{xy} \bmod n \qquad \text{(Eq. 15a)}$$

and $$D'(c') = c'^{x'y'} \bmod n \qquad \text{(Eq. 15b)}$$

Next, the decryptor 30 multiplies the results of the two decryptions to recover the software (step 92):

$$a = D(c) * D'(c') \pmod{n} \qquad \text{(Eq. 16)}$$

and installs the software a on the user's computer system 14 (step 94).

Again, when the numeric representations x/x' are multiplied by the user keys y/y', the resulting products $d_{user}/d_{user}'$ operate in the same manner as the decryption keys d/d' to "decrypt" the two encrypted forms of the software. Thus, the software can be recovered from its encrypted form using: (1) the decryption keys d/d', (2) the numeric representations x/x' and the user keys y/y', or (3) the products xy/x'y' of the numeric representations x/x' and the user keys y/y'. The proof that the numeric representations x/x' and the user keys y/y' (or the products xy/x'y') are equivalent to d/d' (in terms of their ability to "decrypt" the two encrypted forms of the software) is as follows: since ed mod $\phi(n) = 1$ (e'd' mod $\phi(n)=1$) and $y = rd/x \pmod{\phi(n)}$ ( $y' = (1-r)d'/x' \pmod{\phi(n)}$ ) (see above), then:

$$exy = r \pmod{\phi(n)} \qquad \text{(Eq. 17a)}$$

and $$e'x'y' = (1-r) \pmod{\phi(n)} \qquad \text{(Eq. 17b)}$$

and $$exy + e'x'y' = 1 \pmod{\phi(n)} \qquad \text{(Eq. 18)}$$

and $$D(E(a))*D'(E'(a)) = (a^e)^d * (a^{e'})^{d'} \pmod{n} \quad \text{(Eq. 19a)}$$
$$= (a^e)^{xy} * (a^{e'})^{x'y'} \pmod{n} \quad \text{(Eq. 19b)}$$
$$= a^{exy} * a^{e'x'y'} \pmod{n} \quad \text{(Eq. 19c)}$$
$$= a^{exy + e'x'y'} \pmod{n} \quad \text{(Eq. 19d)}$$
$$= a \pmod{n} \quad \text{(Eq. 19e)}$$

The following examples illustrate the steps performed in each of the methods discussed above.

EXAMPLE 1

Single Encryption Method

1. $a=10$
2. $p=11, q=17$
3. $n=pq=(11)(17)=187$
4. $\phi(n) = (p-1)(q-1)$
   $= (11-1)(17-1)$
   $= (10)(16)$
   $= 160$
5. $e=123$
6. $d = e^{-1} \pmod{\phi(n)}$
   $= 123^{-1} \pmod{160}$
   $= 147$
7. $c = E(a) = a^e \bmod n$
   $= 10^{123} \bmod 187$
   $= 54$
8. $id=23$
9. $x=G(id)=G(23)=3^2*7^3=3087$ The Gödel numbering used in this example raises the first k prime numbers in $Z_{\phi(n)}$ that are relatively prime to $\phi(n)$ to the powers of the digits in string id, where k is the number of digits in string id.

10. $y = d/x \pmod{\phi(n)}$
    $= dx^{-1} \pmod{\phi(n)}$
    $= (147)(3087^{-1}) \pmod{160}$
    $= (147)(143) \pmod{160}$
    $= 61$
11. $a = D(c) = c^{xy} \bmod n$
    $= (54^{3087})^{61} \bmod 187$
    $= 142^{61} \bmod 187$
    $= 10$

EXAMPLE 2

Double Encryption Method

1. $a=10$
2. $p=11, q=17$
3. $n=pq=(11)(17)=187$
4. $\phi(n) = (p-1)(q-1)$
   $= (11-1)(17-1)$
   $= (10)(16)$
   $= 160$
5. $e=123, e'=99$
6. $d = e^{-1} \pmod{\phi(n)}$
   $= 123^{-1} \pmod{160}$
   $= 147$
   $d' = e'^{-1} \pmod{\phi(n)}$
   $= 99^{-1} \pmod{160}$
   $= 139$
7. $c = E(a) = a^e \bmod n$
   $= 10^{123} \bmod 187$
   $= 54$
   $c' = E'(a) = a^{e'} \bmod n$
   $= 10^{99} \bmod 187$
   $= 65$
8. $id=23$
9. $x=G(id)=G(23)=3^2*7^3=3087$ The Gödel numbering used to generate x in this example is the same as used in Example 1.

$$x'=G'(id)=G'(23)=3^3*7^2=1323$$

The Gödel numbering used to generate x' in this example raises the first k prime numbers in $Z_{\phi(n)}$ that are relatively prime to $\phi(n)$ to the powers of the digits in string id in reverse order, where k is the number of digits in string id.

10. $r=99$
11. $y = rd/x \pmod{\phi(n)}$
    $= rdx^{-1} \pmod{\phi(n)}$
    $= (99)(147)(3087^{-1})\pmod{160}$
    $= (99)(147)(143)\pmod{160}$
    $= 119$
    $y' = (1-r)d'/x' \pmod{\phi(n)}$
    $= (1-r)d'x'^{-1} \pmod{\phi(n)}$
    $= (1-99)(139)(1323^{-1})\pmod{160}$
    $= (62)(139)(147)\pmod{160}$
    $= 126$
12. $a = D(C) * D'(c') \pmod{n}$
    $= c^{xy} * c'^{x'y'} \pmod{n}$
    $= (54^{3087})^{119} * (65^{1323})^{126} \pmod{187}$
    $= 142^{119} * 10^{126} \pmod{187}$
    $= (65)(144)\pmod{187}$
    $= 10$

EXAMPLE 3

Double Encryption Method With Error-Correcting Coding (modifying Example 2)

$id=10101$

2. Hamming cod matrix = 1 0 1 0 1 0 1 0 1
                       0 1 1 0 0 1 1 0 0
                       0 0 0 1 1 1 1 0 0
                       0 0 0 0 0 0 0 1 1 where the columns containing a single "1" (columns 1, 2, 4, and 8) correspond to the check bits, and where the remaining columns (columns 3, 5, 6, 7, and 9) correspond to the data bits (i.e., the bits in id).

```
 1 010 1
101010101
011001100
000111100
000000011
```

The ECC of id is generated by setting the check bits such that when the check bits and the data bits are multiplied down the corresponding columns, there are an even number of "1"s in each row.

```
001101011
101010101
011001100
000111100
000000011
    ⇓
001000001 = 2 "1"s
001001000 = 2 "1"s
000101000 = 2 "1"s
000000011 = 2 "1"s
```

3. ECC of id=001101011

4. $x$ = $G(ECC \text{ of id})$
    = $G(001101011)$
    = $3^0 * 7^0 * 11^1 * 13^1 * 17^0 * 19^1 * 23^0 * 29^1 * 31^1$
    = $11 * 13 * 19 * 29 * 31$
    = $2442583$ The Gödel numbering used to generate x in this example is the same as used in Example 1.

4. $x$ = $G(ECC \text{ of id})$
    = $G(001101011)$
    = $3^0 * 7^0 * 11^1 * 13^1 * 17^0 * 19^1 * 23^0 * 29^1 * 31^1$
    = $3 * 7 * 17 * 23$
    = $8211$ The Gödel numbering used to generate x' in this example raises the first k prime numbers in $Z_{\phi(n)}$ that are relatively prime to $\phi(n)$ to the powers of the inverse of the digits in string id, where k is the number of digits in string id.

5. $y$ = $rd/x \pmod{\phi(n)}$
    = $rdx^{-1} \pmod{\phi(n)}$
    = $(99)(147)(2442583^{-1}) \pmod{160}$
    = $(99)(147)(7) \pmod{160}$
    = $111$
   $y'$ = $(1-r)d'/x' \pmod{\phi(n)}$
    = $(1-r)d'x'^{-1} \pmod{\phi(n)}$
    = $(1-99)(139)(8211^{-1}) \pmod{160}$
    = $(62)(139)(91) \pmod{160}$
    = $78$
6. $a$ = $D(c) * D'(c') \pmod{n}$
    = $c^{xy} * c'^{x'y'} \pmod{n}$
    = $(54^{2442583})^{111} * (65^{8211})^{78} \pmod{187}$
    = $164^{111} * 10^{78} \pmod{187}$
    = $(65)(144) \pmod{187}$
    = $10$

EXAMPLE 4

Determining x/x' From Product xy/x'y'

(continuing Example 3)
1. xy=271126713 x'y'=640458
2. Find prime factors of xy/x'y' prime factors of xy=3, 11, 13, 19, 29, 31, 37 prime factors of x'y'=2, 3, 3, 7, 13, 17, 23
3. Discard prime factors not used in Gödel numbering relevant prime factors of xy=3, 11, 13, 19, 29, 31 relevant prime factors of x'y'=3, 7, 13, 17, 23
4. Reverse Gödel numbering for x ->101101011 for x'->110110100 ->001001011
5. Reverse Hamming code

```
for x → 101101011
        101010101
        011001100
        000111100
        000000011
            ⇓
        101000001 = 3 "1"s
        001001000 = 2 "1"s
        000101000 = 2 "1"s
        000000011 = 2 "1"s
```

This bit pattern failed the first Hamming equation so the bit corresponding to the column containing a single "1" in the first row is incorrect. The bit pattern should have been 001101011 and id=10101.

```
for x → 001001011
        101010101
        011001100
        000111100
        000000011
            ⇓
        001000001 = 2 "1"s
        001001000 = 2 "1"s
        000001000 = 1 "1"
        000000011 = 2 "1"s
```

This bit pattern failed the third Hamming equation so the bit corresponding to the column containing a single "1" in the third row is incorrect. The bit pattern should have been 001101011 and id=10101.

The preferred embodiments of the present invention use the RSA algorithm. However, one of ordinary skill in the art will appreciate that other public key algorithms having similar characteristics, such as the elliptic curve method, may be used. Additionally, the preferred embodiments of the present invention involve the encryption and decryption of software stored on CD-ROM. As discussed above, one of ordinary skill in the art will appreciate that the principles of the present invention may be applied to any type of information stored on any form of storage media (e.g., floppy disks, hard disks, tape). Furthermore, as discussed above, one of ordinary skill in the art will appreciate that the principles of the present invention may be applied to information distributed through any broadcast medium (e.g., electronic bulletin boards, pay-per-view cable television).

One of ordinary skill in the art will now appreciate that the present invention provides a method and system for controlling unauthorized access to information distributed to users and, more particularly, for controlling unauthorized access to software distributed to users. Although the present invention has been shown and described with reference to preferred embodiments, equivalent alterations and modifications will occur to those skilled in the art upon reading and understanding this specification. The present invention includes all such equivalent alterations and modifications and is limited only by the scope of the following claims.

What is claimed is:

1. A method for controlling unauthorized access to information distributed to users, the method comprising the steps of:

choosing an encryption parameter and generating from it an encryption key using a public key algorithm;

generating a decryption key using the public key algorithm;

encrypting the information using the encryption parameter and the encryption key;

distributing identical copies of the encrypted form of the information to users;

receiving identifying information from a user;

generating a numeric representation of the identifying information;

generating a unique user key using the numeric representation of the identifying information and decryption key information;

providing the user with the unique user key; and decrypting the encrypted form of the information using the numeric representation of the identifying information, the unique user key, and the encryption parameter.

2. The method of claim 1, wherein the step of generating an encryption key includes the step of generating the encryption key using an RSA algorithm, wherein the encryption parameter n is the product of any two prime numbers p and q, wherein $\phi(n)=(p-1)(q-1)$ and the encryption key e is relatively prime to $\phi(n)$;

wherein the step of generating a decryption key includes the step of generating the decryption key using the RSA algorithm, wherein the decryption key $d=e^{-1}$ (mod $\phi(n)$); and wherein the step of encrypting the information includes the step of encrypting the information using the encryption function $E(a)=a^e$ mod n, wherein a is the information to be encrypted.

3. The method of claim 2, wherein the step of generating a unique user key includes the step of generating the unique user key y using the function $y=d/x$ (mod $\phi(n)$), wherein x is the numeric representation of the identifying information.

4. The method of claim 3, wherein the step of decrypting the encrypted form of the information includes the step of decrypting the encrypted form of the information using the decryption function $D(c)=c^{xy}$ mod n, wherein c is the encrypted form of the information.

5. The method of claim 1, wherein the decryption key information is the decryption key.

6. The method of claim 1, wherein the decryption key information is information from which the decryption key can be derived.

7. The method of claim 1, wherein the information distributed to users is software.

8. The method of claim 1, wherein the information distributed to users is stored on CD-ROM.

9. The method of claim 1, wherein the step of receiving identifying information includes the step of receiving unique identifying information from the user.

10. The method of claim 1, wherein the step of receiving identifying information includes the step of receiving a name, a credit card number, and an expiration date for a credit card from the user.

11. The method of claim 1, wherein the step of generating a numeric representation of the identifying information includes the step of generating the numeric representation such that the identifying information is uniquely determinable from the numeric representation and the numeric representation is uniquely determinable from the product of the numeric representation and the unique user key.

12. The method of claim 11, wherein the step of generating the numeric representation includes the step of encoding the identifying information using a Gödel numbering.

13. The method of claim 12, wherein the step of generating the numeric representation further includes the step of encoding the identifying information using an error-correcting coding.

14. The method of claim 13, wherein the step of generating the numeric representation further includes the step of determining whether the numeric representation generated using the Gödel numbering and the error-correcting coding is uniquely determinable from the product of the numeric representation and the unique user key and if not, modifying the identifying information and generating a numeric representation of the modified identifying information using the Gödel numbering and the error-correcting coding.

15. The method of claim 14, wherein the steps of modifying the identifying information and generating a numeric representation of the modified identifying information are repeated until the numeric representation is uniquely determinable from the product of the numeric representation and the unique user key.

16. A method for controlling unauthorized access to information stored on a storage medium, the method comprising the steps of:

generating an encryption key using a public key algorithm;

generating a decryption key using the public key algorithm;

encrypting the information using the encryption key;

storing the encrypted form of the information on the storage medium;

receiving identifying information from a user;

generating a numeric representation of the identifying information;

generating a unique user key using the numeric representation of the identifying information and decryption key information;

providing the user with the unique user key; and decrypting the encrypted form of the information using the numeric representation of the identifying information and the unique user key.

17. A method for controlling unauthorized access to software stored on CD-ROM, the method comprising the steps of:

selecting an encryption key e such that e is relatively prime to $\phi(n)$, wherein n is the product of any two prime numbers p and q and $\phi(n)=(p-1)(q-1)$;

generating a decryption key d such that $d=e^{-1}$ (mod $\phi(n)$);

encrypting the software using the encryption function $E(a)=a^e$ mod n, wherein a is the software to be encrypted;

storing the encrypted form of the software on the CD-ROM;

receiving identifying information from a user;

generating a numeric representation of the identifying information by encoding the identifying information using a Gödel numbering and an error-correcting coding;

generating a unique user key y using the function y=d/x (mod $\phi(n)$), wherein x is the numeric representation of the identifying information;

providing the user with the unique user key y; and decrypting the encrypted form of the software using the decryption function $D(c)=c^{xy}$ mod n, wherein c is the encrypted form of the software.

18. A method for generating a unique user key that can be used together with a numeric representation of identifying information relating to a user to decrypt information that has been encrypted using a public key algorithm, the method comprising the steps of:

receiving identifying information from a user;

generating a numeric representation of the identifying information; and generating a unique user key using the numeric representation of the identifying information and decryption key information.

19. A method for decrypting information that has been encrypted using a public key algorithm, the method comprising the steps of:

receiving identifying information from a user;

receiving a unique user key from the user, the unique user key having been generated using a numeric representation of the identifying information and decryption key information;

generating the numeric representation of the identifying information; and decrypting the encrypted form of the information using the numeric representation of the identifying information and the unique user key.

20. A system for controlling unauthorized access to information distributed to users, the system comprising:

an encryptor for generating an encryption key and a decryption key using a public key algorithm and for encrypting the information using the encryption key;

a user key generator for receiving identifying information from a user, for generating a numeric representation of the identifying information, and for generating a unique user key using the numeric representation of the identifying information and decryption key information; and a decryptor for decrypting the encrypted form of the information using the numeric representation of the identifying information and the unique user key.

21. A method for controlling unauthorized access to information distributed to users, the method comprising the steps of:

generating two encryption keys using a public key algorithm;

generating two decryption keys using the public key algorithm;

encrypting the information twice using the two encryption keys;

distributing the two encrypted forms of the information to users;

receiving identifying information from a user;

generating two numeric representations of the identifying information;

generating two unique user keys using the two numeric representations of the identifying information, decryption key information, and a random number;

providing the user with the two unique user keys;

decrypting the two encrypted forms of the information using the two numeric representations of the identifying information and the two unique user keys; and multiplying the results of the two decryptions to recover the information.

22. The method of claim 21, wherein the step of generating two encryption keys includes the step of generating the two encryption keys using an RSA algorithm, wherein the encryption keys e and e' are relatively prime to $\phi(n)$, n is the product of any two prime numbers p and q, and $\phi(n)=(p-1)(q-1)$;

wherein the step of generating two decryption keys includes the step of generating the two decryption keys using the RSA algorithm, wherein $d=e^{-1}$ (mod $\phi(n)$) and $d'=e'^{-1}$ (mod $\phi(n)$); and wherein the step of encrypting the information twice includes the step of encrypting the information twice using the encryption functions $E(a)=a^e$ mod n and $E'(a)=a^{e'}$ mod n, wherein a is the information to be encrypted.

23. The method of claim 22, wherein the step of generating two unique user keys includes the steps of:

selecting the random number r, wherein $r \in Z_{\phi(n)}$ and $Z_{\phi(n)}$ is equal to the set of numbers from 0 to $(\phi(n)-1)$; and generating two unique user keys y and y' using the functions y=rd/x (mod =(n)) and y'=(1-r)d'/x' (mod $\phi(n)$), wherein x and x' are the numeric representations of the identifying information.

24. The method of claim 23, wherein the step of decrypting the two encrypted forms of the information includes the step of decrypting the two encrypted forms of the information using the decryption functions $D(c)=c^{xy}$ mod n and $D'(c')=c'^{x'y'}$ mod n, wherein c and c' are the two encrypted forms of the information.

25. The method of claim 21, wherein the decryption key information is the two decryption keys.

26. The method of claim 21, wherein the decryption key information is information from which the two decryption keys can be derived.

27. The method of claim 21, wherein the information distributed to users is software.

28. The method of claim 21, wherein the information distributed to users is stored on CD-ROM.

29. The method of claim 21, wherein the step of receiving identifying information includes the step of receiving unique identifying information from the user.

30. The method of claim 21, wherein the step of receiving identifying information includes the step of receiving a name, a credit card number, and an expiration date for a credit card from the user.

31. The method of claim 21, wherein the step of generating two numeric representations includes the step of generating the two numeric representations such that the identifying information is uniquely determinable from the two numeric representations and the two numeric representations are uniquely determinable from the products of the two numeric representations and the two unique user keys.

32. The method of claim 31, wherein the step of generating the two numeric representations further includes the step of encoding the identifying information twice using a Gödel numbering.

33. The method of claim 32, wherein the step of generating the two numeric representations further includes the step of encoding the identifying information twice using an error-correcting coding.

34. The method of claim 33, wherein the step of generating the two numeric representations further includes the step of determining whether the two numeric representations generated using the Gödel numbering and the error-correcting coding are uniquely determinable from the products of the two numeric representations and the two unique user keys and if not, modifying the identifying information and generating two numeric representations of the modified identifying information using the Gödel numbering and the error-correcting coding.

35. The method of claim 34, wherein the steps of modifying the identifying information and generating two numeric representations of the modified identifying information are repeated until the two numeric representations are uniquely determinable from the products of the two numeric representations and the two unique user keys.

36. A method for controlling unauthorized access to information stored on a storage medium, the method comprising the steps of:
   generating two encryption keys using a public key algorithm;
   generating two decryption keys using the public key algorithm;
   encrypting the information twice using the two encryption keys;
   storing the two encrypted forms of the information on the storage medium;
   receiving identifying information from a user;
   generating two numeric representations of the identifying information;
   generating two unique user keys using the two numeric representations of the identifying information, decryption key information, and a random number;
   providing the user with the two unique user keys;
   decrypting the two encrypted forms of the information using the two numeric representations of the identifying information and the two unique user keys; and
   multiplying the results of the two decryptions to recover the information.

37. A method for controlling unauthorized access to software stored on CD-ROM, the method comprising the steps of:
   selecting two encryption keys e and e' such that e and e' are relatively prime to $\phi(n)$, wherein n is the product of any two prime numbers p and q and $\phi(n)=(p-1)(q-1)$;
   generating two decryption keys d and d' such that $d=e^{-1}$ (mod $\phi(n)$) and $d'=e'^{-1}$ (mod $\phi(n)$);
   encrypting the software twice using the encryption functions $E(a)=a^e$ mod n and $E'(a)=a^{e'}$ mod n, wherein a is the software to be encrypted;
   storing the two encrypted forms of the software on the CD-ROM;
   receiving identifying information from a user;
   generating two numeric representations of the identifying information by modifying the identifying information and encoding the identifying information and the modified identifying information using a Gödel numbering and an error-correcting coding;
   selecting a random number r, wherein $r \in Z_{\phi(n)}$ and $Z_{\phi(n)}$ is equal to the set of numbers from 0 to ($\phi(n)-1$);
   generating two unique user keys using the functions $y=rd/x$ (mod $\phi(n)$) and $y'=(1-r)d'/x'$ (mod $\phi(n)$), wherein x and x' are the numeric representations of the identifying information and the modified identifying information;
   decrypting the two encrypted forms of the software using the decryption functions $D(c)=c^d$ mod n and $D'(c')=c'^{d'}$ mod n, wherein c and c' are the two encrypted forms of the software; and
   multiplying the results of the two decryptions to recover the software.

38. A method for decrypting information that has been encrypted using a public key algorithm, the method comprising the steps of:
   receiving identifying information from a user;
   receiving two unique user keys from the user, the unique user keys having been generated using two numeric representations of the identifying information and decryption key information;
   generating the two numeric representations of the identifying information;
   decrypting the two encrypted forms of the information using the two numeric representations of the identifying information and the two unique user keys; and
   multiplying the results of the two decryptions to recover the information.

39. A system for controlling unauthorized access to information distributed to users, the system comprising:
   an encryptor for generating two encryption keys and two decryption keys using a public key algorithm and for encrypting the information twice using the two encryption keys;
   a user key generator for receiving identifying information from a user, for generating two numeric representations of the identifying information, and for generating two unique user keys using the two numeric representations of the identifying information, decryption key information, and a random number; and
   a decryptor for decrypting the two encrypted forms of the information using the two numeric representations of the identifying information and the two unique user keys and multiplying the results of the two decryptions to recover the information.

* * * * *